United States Patent [19]

Newman

[11] 4,229,687

[45] Oct. 21, 1980

[54] TEMPERATURE MAINTAINED BATTERY SYSTEM

[75] Inventor: William A. Newman, Salt Lake City, Utah

[73] Assignee: Utah Research & Development Corporation, Salt Lake City, Utah

[21] Appl. No.: 36,363

[22] Filed: May 7, 1979

[51] Int. Cl.³ .......................... H02J 7/00; H05K 7/20
[52] U.S. Cl. .......................................... 320/2; 320/35; 361/383; 361/386; 429/120
[58] Field of Search ...................... 320/2, 35; 361/379, 361/381, 383, 384, 386, 388; 174/15; 429/120

[56] References Cited

U.S. PATENT DOCUMENTS

| | | | |
|---|---|---|---|
| 2,984,077 | 5/1961 | Gaskill | 361/381 X |
| 3,461,954 | 8/1969 | Banks et al. | 429/120 X |
| 3,717,805 | 2/1973 | Gnaedinger et al. | 361/388 X |
| 3,740,636 | 6/1973 | Hogrefe et al. | 320/35 X |
| 4,177,499 | 12/1979 | Volkmann | 361/388 |

Primary Examiner—Robert J. Hickey
Attorney, Agent, or Firm—Trask & Britt

[57] ABSTRACT

A chassis contains a battery charger connected to a multi-cell battery. The charger receives direct current from an external direct current power source and has means to automatically selectively charge the battery in accordance with a preselected charging program relating to temperature adjusted state of discharge of the battery. A heater device is positioned within the chassis which includes heater elements and a thermal switch which activates the heater elements to maintain the battery above a certain predetermined temperature in accordance with preselected temperature conditions occurring within the chassis. A cooling device within the chassis includes a cooler regulator, a temperature sensor, and peltier effect cooler elements. The cooler regulator activates and deactivates the peltier cooler elements in accordance with preselected temperature conditions within the chassis sensed by the temperature sensor. Various vehicle function circuitry may also be positioned within the chassis. The contents of the chassis are positioned to form a passage proximate the battery in communication with an inlet and outlet in the chassis to receive air for cooling purposes from an external source.

25 Claims, 12 Drawing Figures

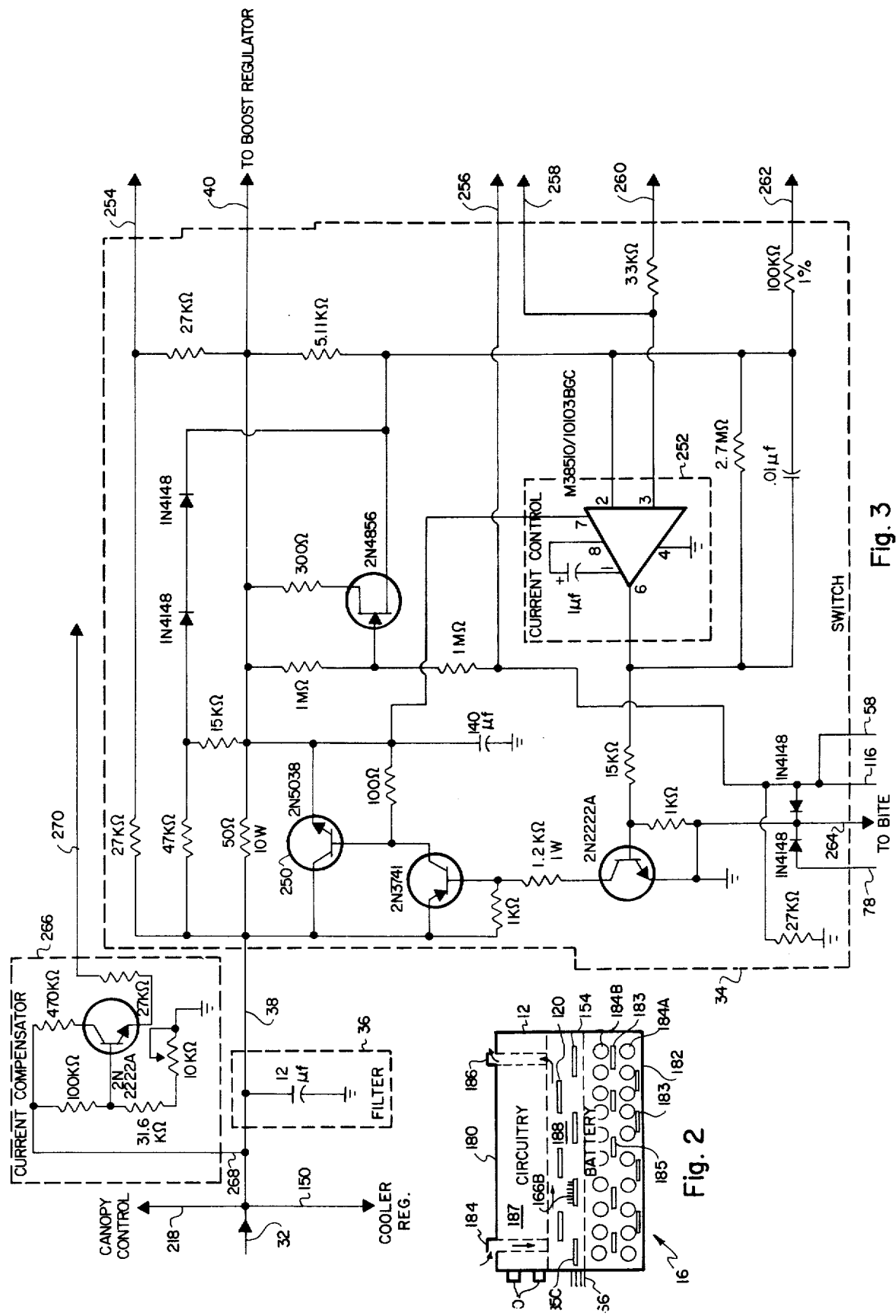

BUILT IN TEST EQUIPMENT (BITE)

TEMPERATURE MAINTAINED BATTERY SYSTEM

BACKGROUND OF THE INVENTION

1. Field

This invention relates to battery systems and battery chargers. More particularly, this invention provides for a temperature maintained battery system containing a battery, battery charger and heating and cooling devices which is particularly suitable for use with vehicles.

2. State of the Art

In many applications batteries are used as a temporary emergency source of power. For example, in certain kinds of vehicles, such as aircraft, batteries act as a source of power for starting engines and as an emergency source of power in the event the generator typically associated with the engine of the vehicle fails. For such applications, it is important to return the battery to and maintain it in a fully charged condition after use. However, it is well known that charging a battery to and maintaining it in a fully charged condition is a multi-faceted problem involving many factors. For example, battery type, battery age and useful life, available charging power, physical environment, and battery capacity are just some of the factors to be considered in selecting not only the battery to be used but also the battery charger to optimally charge and recharge the battery.

In some applications, the vehicle may experience a wide range of temperatures from very cold to very hot. Some vehicles, such as automobiles, tanks, bulldozers and the like may experience temperatures during certain seasons from well below 0° F. to well above 100° F. in other seasons. An aircraft may experience such temperature ranges over a very short period of time. For example, on a runway it may experience temperatures substantially above 100° F. Yet, when airborne it may be in an ambient temperature environment which may be substantially below −50° F. depending on season and altitude.

Batteries and charging systems hereinbefore known have not been particularly adaptable for use in environments where temperature ranges are from well below 0° F. to well above 100° F. As known to those skilled in the art, battery capacity, battery age, battery useful life and similar battery characteristics are all affected by ambient temperature environments. Typically, batteries presently used in vehicles that do suffer wide ranges of temperature by virtue of their environment, are selected to have a battery capacity and other battery characteristics relating to average conditions or to be within acceptable minimum limits under the full range of anticipated conditions. Accordingly, battery weight, battery capacity and similar characteristics may be at a bare minimum under certain-adverse circumstances and may even fall below minimum desired characteristics in certain ambient environmental conditions which fall outside of those anticipated. Further, during normal operations, the battery may be oversized so that the weight and cost thereof are undesirable.

It is also known to those skilled in the art that battery chargers generate heat during charging operations. Accordingly, it has become a practice to locate charging equipment somewhat remote from the battery itself because the heat generated by the charger may adversely affect the battery. In some circumstances, this generates maintenance problems as well as weight problems by virtue of the need to provide two separate components. That is, a battery itself comprised of a plurality of cells must be manufactured and located in a vehicle separately remote from a separately designed and contained battery charging unit. Excessive weight, cost and maintenance problems may adhere by virtue of separate construction and installation.

Battery heating and cooling has a been a technique employed in the art to provide more acceptable tolerances for battery characteristics. Known battery cooling techniques include fluid water-cooling type systems for large capacity type batteries such as those which may be found on submarines. Known heating methods include positioning the battery near the vehicle engineer or putting heaters for heating air supplied to ventilate a battery. However, a practical vehicle battery relatively small in size which has automatic heating and cooling is unknown. That is, there is no known system is which a battery charger and a battery have been combined into one integral system which includes cooling and heating means to provide a unitized easily removable lower weight unit (relative to capacity and temperature environment) for use in vehicles.

SUMMARY OF THE INVENTION

A battery system has a battery which is removably conductively connectable to an external direct current load. A battery charger is positioned within the chassis and removably conductively connectable to an external source of direct current power and conductively connected to the battery. The battery charger has means to automatically selectively charge the battery when the battery is in a preselected state of discharge. Heater means are also positioned within the chassis and are removably conductively connectable to an external source of power. The heater means includes heater elements and switch means. The switch means is conductively connected to the external source and to the heater element means. It is operative between conductive and nonconductive conditions to activate the heater elements in accordance with preselected temperature conditions within the chassis. Cooling means is positioned within the chassis and is comprised of a cooler regulator, temperature sensing means and at least one peltier effect cooler element positioned within the chassis and conductively connected to the cooler regulator. The cooler regulator receives power from an external source and activates and deactivates the cooler element in accordance with preselected temperature conditions within the chassis as sensed by the temperature sensing means.

In one embodiment, the switch means of the heater means is preferably a thermal switch which is nonconductive above a first preselected temperature and conductive below a second preselected temperature. The first and second preselected temperatures are selected by the user so that the heater element means is energized to generate heat within the chassis and in turn heat the battery and to substantially maintain it above a preselected minimum temperature.

In another embodiment, the cooler regulator activates the cooler elements at a third preselected temperature and deactivates the cooler element at a fourth preselected temperature to in turn cool the chassis interior and the battery and to substantially maintain it below a preselected maximum temperature. The cooling means preferably have a plurality of peltier effect coolers electrically connected in series and positioned about the chassis.

The cooling means includes heat removal means associated with cooler elements to transfer heat from interior to exterior the chassis. The cooling means preferably includes cooling fins adapted external to the chassis. Peltier effect coolers are preferably positioned to transfer heat to the fins. The cooling means also may include forming the chassis to be enclosed with an air inlet and an air outlet to receive air flow from an external source and to exhaust that air flow. The contents of the chassis are positioned therewithin to form an air passage passing proximate the battery in communication with the inlet and the outlet to remove heat therefrom.

In yet another embodiment, the battery charger is preferably comprised of switch means conductively connected to receive power from the external source. A boost regulator is conductively connected to receive power from the switch means and to the battery to supply charging signals thereto. Second temperature sensing means are positioned within the chassis to sense temperature and generate a battery temperature reflective signal. The charger includes a voltage control circuit conductively connected to the temperature sensing means to receive the temperature reflective signal and to the switch means to supply a switching signal. The voltage control circuit also receives a battery voltage signal from the battery and supplies a boost signal to the boost regulator. The voltage control circuit determines the temperature adjusted state of charge of the battery from the temperature reflective signal and the battery voltage signal and supplies a switching signal and control signal to the boost regulator to cause the battery to be charged in accordance with the preselected charging program related to the temperature adjusted state of discharge of the battery.

The battery charger preferably includes a safety circuit which includes a hot battery detector and a cell balance detector. The hot battery detector is conductively connected to the second temperature sensing means to receive the temperature reflective signal therefrom, and to the switch the supply a safety signal thereto to cause the switch to become nonconductive when the temperature sensing means generates a temperature reflective signal indicative of a hot battery condition.

The cell balance detector is conductively connected to the battery to sense the voltage across selected portions thereof. Upon detecting a preselected imbalance, the cell balance detector sends a safety signal to the switch to cause the switch to become nonconductive.

A low battery detector is also included in the safety circuit and conductively connected to the battery to detect battery state of charge or discharge. The low battery detector supplies an external indication thereof as desired by the user.

Built-in testing circuitry is included within the chassis and conductively connected to external indicator means through the chassis and to the battery charger and other circuitry within the chassis. The testing equipment monitors for abnormal operation of the charger and supplies signals indicative thereof to external indicators.

In another embodiment, vehicle function circuitry is included within the battery chassis to provide external vehicle functions and controls as desired by the user.

In other embodiments, the temperature controlled battery system may be combined with a vehicle and other battery systems to provide a source of DC battery power to the vehicle.

BRIEF DESCRIPTION OF THE DRAWINGS

In the drawings, which illustrate the best mode presently contemplated for carrying out the invention.

FIG. 2 is a representative cross-sectional view of a chassis and components therewithin of a temperature maintained battery charging system of the instant invention;

FIG. 3 is a circuit diagram showing circuitry of a switch of a battery charger for use with the instant invention;

DESCRIPTION OF THE ILLUSTRATED EMBODIMENT

Figure 1:
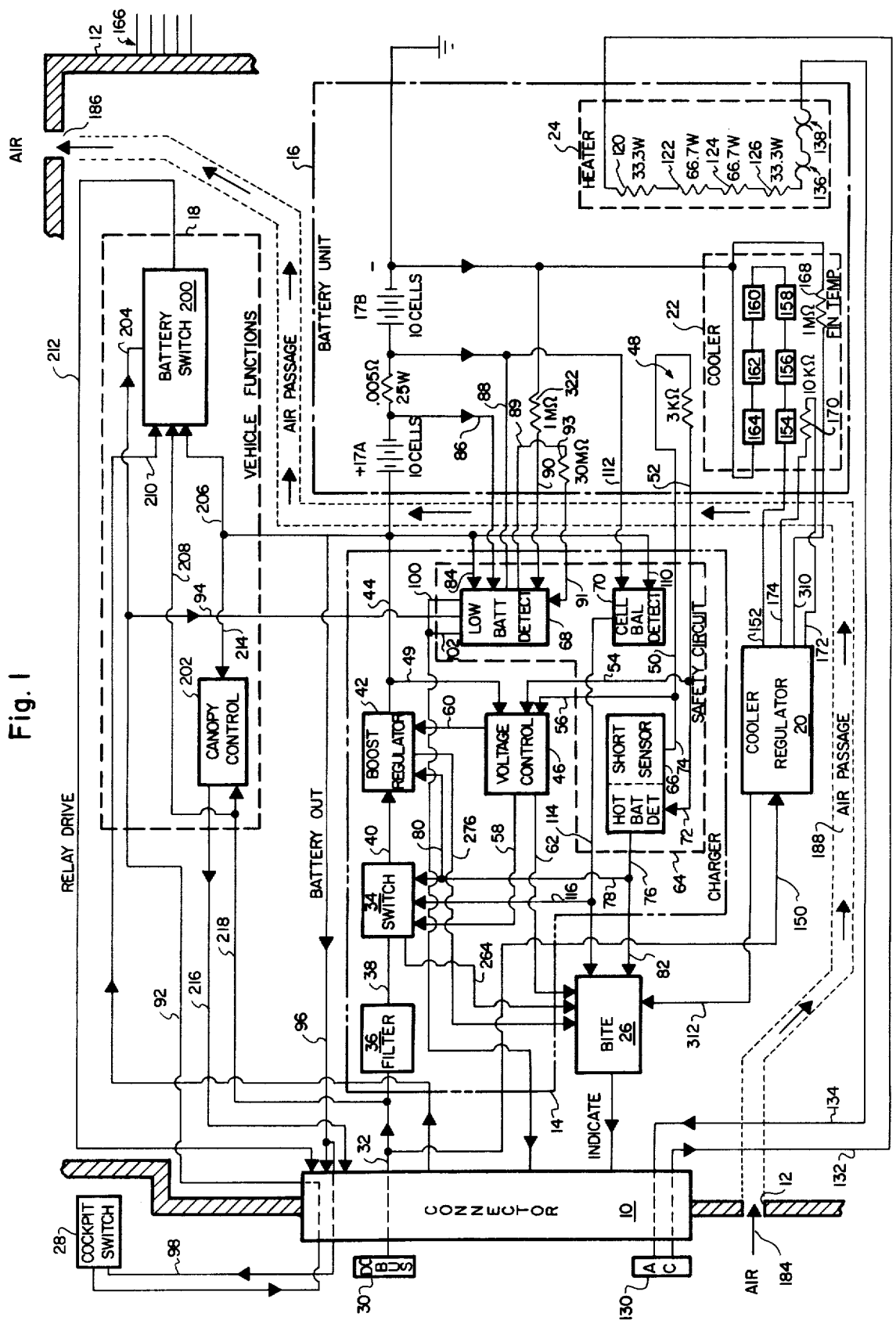
FIG. 1 is a block diagram of a temperature maintained battery system of the instant invention.

FIG. 1 illustrates a temperature maintained battery system particularly adapted for use with an aircraft. In particular, the system is adapted for use with an aircraft having two independent but related temperature maintained battery systems positioned therein to act as sources of emergency and regulatory power. The system may be adapted for use in a wide variety of vehicles including automobiles, trucks, bulldozers and the like.

The system as illustrated in FIG. 1 has a connector 10 positioned to interconnect from external to internal the chassis 12. The chassis 12 contains a battery charger 14, a battery unit 16, vehicle function circuitry 18, cooling means comprised of a cooler regulator 20 and cooler elements 22, and heater means 24. The system illustrated also has built-in test equipment 26 positioned within the chassis 12 and a cockpit switch 28 positioned external the chassis and in a position for operation by the user. The cockpit switch 28 may be regarded as a single-pole single-throw switch to supply a control signal or an activate signal to circuitry within the chassis 12 as more fully discussed hereinafter.

The vehicle, which in this embodiment is an aircraft as hereinbefore stated, has a DC bus which is powered by an external source such as a generator powered by the engine of the aircraft or by other means. The DC power is supplied to the battery charger 14 via conductor 32 to a switch 34 via a filter 36 and conductor 38. The switch 34 supplies power via conductor 40 to a boost regulator 42. The boost regulator 42 supplies its output via conductor 44 to the battery unit 16 and the battery 17 which is comprised of two groups of ten cells each 17A and 17B connected in series. The battery unit 16 contains other components as more fully discussed hereinafter.

The battery charger may be of the type disclosed in U.S. Pat. No. 4,016,473 (Newman) or U.S. Pat. No. 4,061,956 (Brown et al). In this system, however, the battery charger 14 has a voltage control circuit 46 and temperature sensing means 48 which is a thermistor as illustrated in FIG. 1. The temperature sensing means 48 generates a temperature reflective signal reflecting the temperature of the interior of the chassis preferably proximate the battery 17. The signal is supplied to the voltage control circuit 46 via conductors 50, 52, 54 and 56. The voltage control circuit 46 also receives a battery voltage signal via conductor 49. The voltage control circuit 46 receives the battery voltage signal and the temperature reflective signal which are indicative of battery capacity and supplies an output signal via conductor 58 to the switch 34 to cause the switch to become conductive to commence battery charging upon detection of a battery capacity preselected by the user. The voltage control also supplies a control signal via conductors 60 to the boost regulator 42 to cause the boost regulator 42 to supply a charging signal to the battery 17. The voltage control 46, in effect, operates the switch 34 and boost regulator 42 to charge the battery in two modes which may be deemed the boost mode (approximately a 6 ampere current charge) and a trickle charge mode (200 milliampere trickle charge). The voltage control 46 also supplies an output via conductor 62 to the BITE circuitry 26.

The battery charger 14 preferably includes a safety circuit 46 which includes a hot battery detector 66, a low battery detector 68 and a cell balance detector 70.

The hot battery detector 66 receives temperature reflective signals from the temperature sensing means 48 via conductors 50, 52, 72 and 74. The hot battery detector 66 detects the existence of a temperature reflective signal indicative of a hot battery condition and supplies an output signal via conductors 76 and 78 to the switch 34 to cause the switch to become nonconductive upon the occurrence of a preselected temperature as detected by the sensing means 48. For the instant embodiment, that preselected temperature is about 115° F. The temperature will vary for different types and kinds of batteries and for different vehicles. The temperature here selected precludes the possibility of thermal runaway. The hot battery detector 66 also supplies an output to the built-in test equipment circuitry 26 via conductors 76 and 82.

The low battery detector 68 receives input voltages and current signals from across the upper half 17A or the first ten cells of the battery unit 16 via conductors 84 and 86 and across the lower half 17B or other ten cells of the battery unit 16 via conductors 88 and 90. The low battery detector also receives an input from temperature compensating means 93 via conductors 89 and 91, as more fully discussed hereinafter. The low battery detector 68 also receives an input from vehicle function circuitry 18 and more particularly from the cockpit switch 28 via conductors 92 and 94. The low battery detector 68, when activated by the cockpit switch 28 via conductors 92 and 94, supplies an output signal via conductor 100 and 102 to an external indicator to indicate the existence of a low battery condition based on the temperature compensated or temperature adjusted battery capacity. The low battery detector 68 functions as part of the safety circuit simply to indicate to the user of the vehicle that an unsafe or undesirable condition exists in that the battery 17 has attained a preselected level of discharge. That is, the detector 68 combines battery voltage and a temperature signal to determine the level of charge or discharge. When the level of charge falls to a 45% capacity level, the detector 68 sends a signal to indicate the existence of a low battery condition.

The safety circuit 64 also includes a cell balance detector 70. The detector 70 receives a battery voltage input across a portion of the battery via conductors 110 and 112. The cell balance detector 70 detects the existence of imbalance in the cells in the battery and sends a safety signal to the switch 34 via conductors 114 and 116. The safety signal sent by the cell balanced detector causes the switch to become nonconductive in the event the cell balance detects a significant out-of-balance condition preselected by the user.

In operation, the battery charger 14 charges the battery 16 based on its detected or determined level of charge or discharge as determined by the voltage control 46 from the battery voltage and the temperature reflective signal received from the temperature sensor 48. In particular, the voltage control 46 causes the switch 34 to become conductive and allow a trickle charge (200 milliamperes) to be supplied through the boost regulator to the battery to charge the battery when the battery is in a substantially charged condition (about 80% to 85% of fully charged). When the battery is in a substantially discharged condition (less than about 80% to 85% of fully charged), then the voltage control 46 causes the boost regulator 42 to operate to in turn cause a higher level of charging current (about 6 amperes) to be applied to the battery to in turn cause it to return to a substantially fully charged condition more rapidly.

The heater means 24 of the system is depicted as positioned in the battery unit 16. It is here shown to be a series of electrical resistance heaters 120, 122, 124 and 126 connected in series and positioned at different locations within the battery unit 16. They may be positioned anywhere within the chassis 12, but are preferably in the battery unit 16 proximate the battery 17 to provide heat to the battery. Two of the heaters 120, 126 are 33.3 watt heaters; and the other two heaters are 66.7 watt heaters 122, 124. The heaters 120 and 126 are preferably powered from an external source of AC power 130. DC powered heaters may also be used, if desired. The power is received through the connector 10 and via conductors 132 and 134. A pair of thermal switches 136 and 138 are connected electrically in series with each other and with the heaters 120–126 to activate and deactivate the heaters. The thermal switches 136 and 138 constitute switching means which activate the heaters 120–126 when the temperature detected by the thermal switches reaches a preselected temperature of about 50° F. plus or minus 5° F. The switches 136 and 138 become nonconductive or open when the temperature elevates above a second preselected temperature of about 60° F. Two thermal switches 136 and 138 are used to provide an extra measure of safety. That is, if one switch 136 (138) should fail closed or in a conductive condition, the other switch 138 (136) will continue to operate to cause the heaters 120–128 to activate and deactivate in a normal fashion. Removal of the entire temperature maintained battery system for repair and maintenance is thus precluded if but one thermal switch fails. Battery system failure is thus minimized because a failure of one thermal switch could cause the heaters to operate to a point where the battery 17 attains a temperature in which the hot battery detector 66 would cause the battery charger 14 to become inoperative because of high temperatures. Those skilled in the art will recognize that the number of heaters to be used, their size, their placement and electrical configuration (series, parallel) may be varied for different systems and different applications (environments).

By employing heaters such as heaters 120, 122, 124 and 126, the battery 17 can be maintained above a certain preselected minimum temperature. Further, the battery 17 can be heated up to that temperature if it has cooled below that temperature when not in use or not otherwise operated or provided with a source of AC power. By elevating a temperature above the preselected minimum temperature, battery useful life and battery age can be extended. Further, battery capacity and the energy available for discharge or deep discharge purposes is enhanced or greater by virtue of the increased temperature. Thus, for emergency purposes or for purposes where deep discharge is necessary for the safety of the vehicle and/or for other reasons, a greater amount of battery capacity is available for use.

As earlier discussed, the temperature maintained battery system of the instant invention has cooling means comprising a cooler regulator 20 and a cooler or cooler element 22. The cooler regulator 20 receives power from the DC bus 30 via conductors 32, 38 and 150. However, it can be powered from any AC or DC source, as desired. The cooler regulator 20 supplies power via conductor 152 to, as here shown, six peltier effect coolers 154, 156, 158, 160, 162 and 164. As known to those skilled in the art, the peltier effect is the production or absorption of heat at the junction of two metals when current is passed through the junction. Reversing the direction of current changes the production of heat to an absorption and vice versa. In the instant embodiment, current is passed through selected peltier effect junctions which are the-peltier effect coolers to extract heat from the junctions. The coolers 154-164 may be positioned anywhere in the chassis 12. They are preferably positioned proximate the battery 17 and simultaneously proximate a plurality of cooling fins 166 which constitute that removal means. The fins 166 are adapted to the chassis 12 external to the chassis 12. Heat absorbed by the peltier effect coolers 154-164 is transferred to the fins 166 for dissipation to the atmosphere immediately surrounding the chassis 12. A temperature sensing resistor 168 is preferably positioned proximate the fins 166 to sense the temperature thereof and to supply a signal reflective of fin temperature to the cooler regulator. In addition, a temperature sensor 170 is positioned within the chassis 12 preferably proximate the battery 17 to sense the temperature therein and supply a signal reflective thereof to the cooling regulator 20 via conductors 172 and 174.

In operation, the temperature sensor 170 supplies a temperature reflective signal to the cooler regulator 20. When the temperature reflective signal indicates that the temperature sensed has reached a certain maximum third preselected temperature (about 65° F. to 70° F.), the cooler regulator 20 activates to supply power to the peltier effect coolers 154-164 to initiate cooling operation. When the battery temperature sensed by the sensing means 170 has reduced to a fourth preselected temperature (about 65° F.), the cooler regulator 20 deactivates the peltier effect coolers 154 through 164.

Those skilled in the art will recognize that one or more peltier effect coolers may be sufficient depending upon the application and environment at hand. Indeed, more than six peltier effect coolers may be used in selected circumstances.

The peltier effect coolers 154 through 164 have been found to be useful for cooling a battery together with a battery charger contained within a chassis, as herein disclosed. The coolers have obviously no moving parts, no liquids or any other particular structure which would make cooling a complex mechanical function. Further, the failure of one cooler does not inhibit the cooling function. That is, one or more coolers 154 through 164 may fail without inhibiting the cooling capability of the remaining functioning coolers. Thus, the failure of one or more coolers does not remove the cooling function in its entirety and in turn cause an unsafe condition to potentially occur associated with the battery system. Use of peltier effect coolers permits assembly of a battery and battery charger into one unit or chassis. The cooling precludes damage to charger components by removing battery generated heat as well as charger generated heat.

It should also be recognized that the cooling function is particularly important in precluding thermal runaway. That is, in certain circumstances when a battery reaches a certain high temperature, it can discharge very very rapidly causing substantial gassing within closed or open cells and in turn potentially explode by virtue of the heat generated when the battery is discharging rapidly. The cooling function together with charger safety circuitry 64 precludes or prevents the battery 17 from reaching or attaining a temperature where thermal runaway becomes a possibility or a potentiality. Thus, inherent safety is added to the battery system in its entirety by virtue of the use of the cooling system as herein disclosed.

It may be also noted that by using a cooling and heating function, as herein disclosed, the battery charger and the battery itself may be packaged into one chassis or into a single removable unit. In many applications, this produces a substantial savings in weight, in initial cost, and in maintenance time. That is, maintenance may be simply effected by removing a defective battery system or a depleted battery system and replacing it with a new one. The defective or depleted battery may be returned to the manufacturer for bench repairs as opposed to expensive on-site repairs. Substantial cost savings may be realized also by eliminating the need for having costly or expensive training programs for on site personnel.

The battery unit 16, as illustrated in FIG. 1, contains a plurality of cells. For the instant aircraft embodiment, the battery 17 is comprises of 20 nickel cadmium closed cell batteries such as the type made by the SAFT of Valdosta, Georgia, Model No. VR7F. The batteries are 7 ampere hour 1.25 volt sealed cell units having a potassium hydroxide electrolyte. Those skilled in the art will recgnize that other comparable battery cells may be used. The criteria desired is that the cells be sealed, lightweight, low in maintenance and have a long life not withstanding frequent charges and discharges. A sealed cell is typically a low maintenance cell as opposed to an open cell battery such as lead acid type commonly associated with motor vehicles in use today. The battery unit 16 also is illustrated to contain the temperature sensing means 48, the coolers 22 and the heater 24 to illustrate the general physical proximity of those devices to the actual battery cells.

Referring now to FIG. 2, the cross-sectional representation of the battery system shows the physical relationship of the components positioned within the chassis 12. More particularly, the chassis 12 has a top 180 and a bottom 182. Battery cells 184 are positioned along or in the bottom portion of the chassis. The cooler elements 154–164 together with the heater elements 120–126 are positioned in and about the chassis, as desired by the user, to effect desired heating and cooling. Preferably, the cells 184 may be arranged in rows with some on the bottom 184A and some positioned thereabove 184B, as illustrated. Heaters 183 and coolers 185 may be positioned below and inbetween the rows and above the top row to obtain more even heating and cooling in and about the battery individual cells. Those skilled in the art will recognize that a variety of placements may be devised to effectuate the cooling and heating purposes as herein described.

A circuitry section 187 is positioned above the battery unit 16 or battery section. The heat removal means associated with the cooling means preferably includes an inlet 184 in the chassis 12 to allow external air from an external source to enter the chassis 12, an outlet 186 for exhausting the air entering through the inlet 184, and a passageway 188 through the interior of the chassis 12 to allow the air entering through the inlet-184 to circulate therethrough to cool the battery cells as well as the components of the circuitry. Components within the chassis 12 are positioned therein to form the passageway 188 which is in communication with the inlet 184 and the outlet 196. The passageway 188 preferably passes proximate the battery cells 184A, 184B. Various cooling fins 166, such as those hereinabove illustrated (FIG. 1), may be positioned about the chassis 12 to assist in extracting heat from interior and transmitting it to the environment thereabout. Coolers 185C may be positioned proximate the fins to enhance heat transfer to the exterior. Some coolers 185D may have fins 166B to facilitate heat transfer to the circulating air in the passageway 188.

Referring back to FIG. 1, the vehicle function circuitry 18 is positioned within the chassis 12 and is here illustrated to consist of a battery switch 200 and a canopy control circuit 202. The embodiment herein disclosed is particularly adapted for use in an aircraft having two identical or substantially identical battery systems such as the one herein disclosed. Duplicate battery systems are employed to provide additional reserve power as well as emergency power for obvious safety reasons. The battery switch 200 is connected to the cockpit switch 28 hereinbefore described. The cockpit switch 28 supplies a signal to the battery switch 200 via conductors 92 and 204. The battery switch 200 also receives power from the battery 16 via conductor 206. The battery switch 200 also senses the power available on the DC bus 30 via conductor 208 and the voltage at the output of the alternate battery via conductor 210. The battery switch compares these voltages and determines which source of power is available upon activation by the cockpit switch 28. That is, if the aircraft is functioning and power is available from aircraft generators, the battery switch determines that power from the battery is not necessary. Alternately, if the other battery is sensed to be below certain level of capacity by virtue of a reduced output voltage, then the battery will supply power to various external functions known as relay drive via conductor 212.

In some aircraft applications, the aircraft has a canopy which must be operated to permit the pilot to enter the cockpit area to commence startup procedures. Thus, it is necessary to provide power to operate the canopy when auxiliary power sources are not available. Canopy control circuitry 202 is conductively connected by conductor 214 to receive power from the battery 17 and supply power externally via conductor 216 to a canopy control motor or similar device to cause the operator to provide power for the operator to open or close the canopy at will. The canopy control 202 also is conductively connected via conductor 218 to the input line 32 which in turn receives power from the DC bus 30. Thus, if the aircraft is operating or has an external source of power, the canopy control circuitry will detect the power available from a source other than the battery and will use that power and supply it via conductor 216 for canopy operations.

FIGS. 3 through 12 are detailed circuit diagrams of the various components illustrated in block diagram format on FIG. 1. Circuits contain representative component identification and component values which those skilled in the art will recognize can be varied and modified as necessary for a particular application. Further, the circuits can be substantially modified as necessary for varying applications that affect the basic character or function of the circuit as herein disclosed.

FIG. 3 illustrates a battery charger switch circuit 34 connected to receive power from the external source 30 via conductors 32 and 38 and filter 36. It supplies power to the boost regulator 42 via conductor 40. The switch 34 becomes conductive when transistor 250 fires allowing a conductive path to exist between the external power 30 supply and the boost regulator 42. The current control amplifier 252 is also contained within the switch 34 to provide a current control function for the trickle charge mode. The switch 34 also receives input from the hot battery detector via conductor 78, from the cell balance detector via conductor 116 and from the voltage control circuit 46 via conductor 58. The switch 34 also is conductively connected to the boost regulator 42 by conductors 254, 256, 258, 260 and 262. The interconnection of these conductors with the boost regulator provides for the interchange of bias and control signals therebetween, as apparent to one skilled in the art. The switch 34 also supplies a signal to the built-in test equipment via conductor 264.

FIG. 3 also contains a current compensator 266 which is conductively connected by conductor 268 to receive power from the external source. Compensator 266 supplies an output signal to the boost regulator 42 in which input line voltage variances are not reflected. The output to the boost regulator is supplied via conductor 270.

Figure 4:
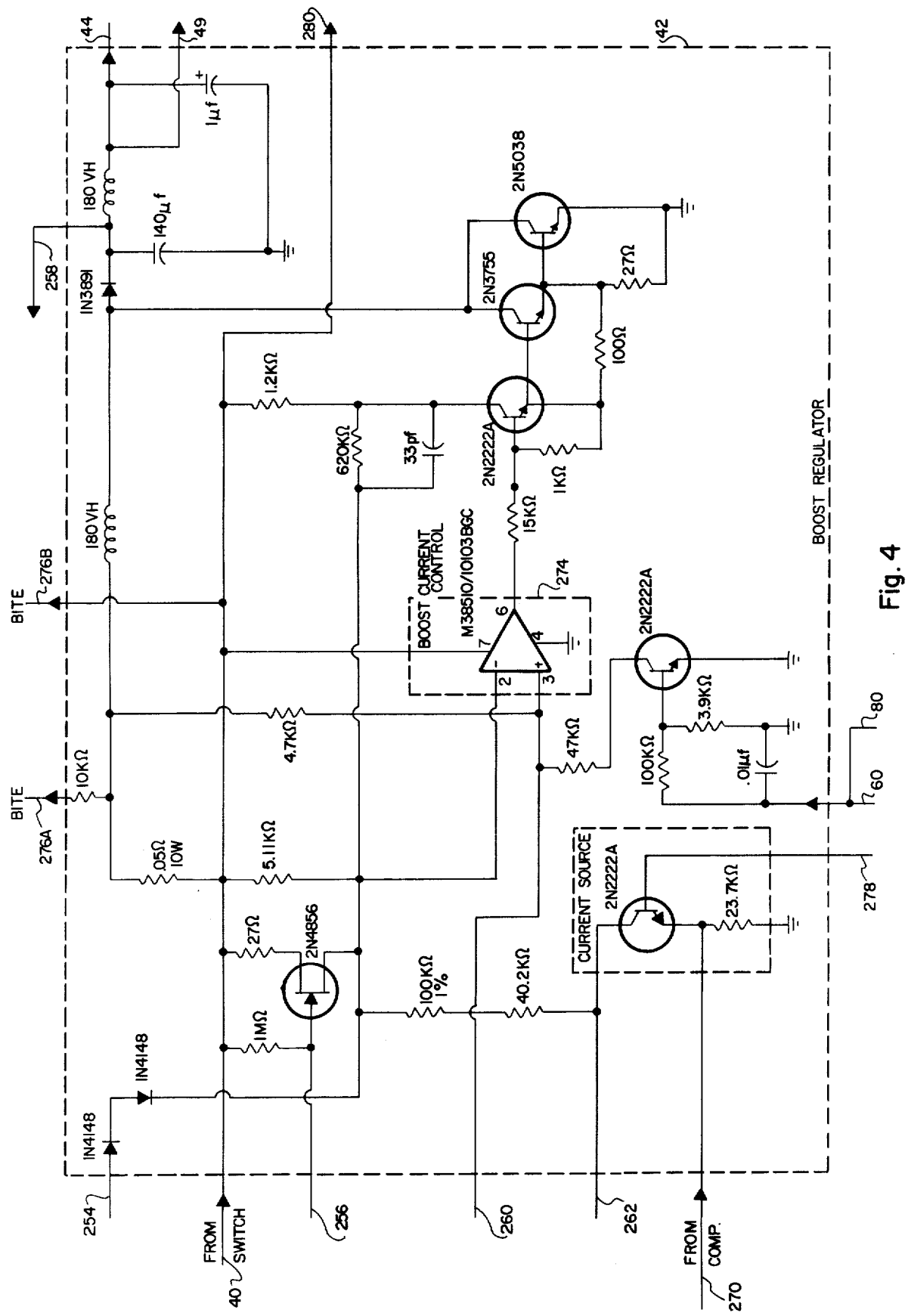
FIG. 4 is a circuit diagram of a boost regulator of a battery charger for use with the instant invention.

FIG. 4 illustrates the boost regulator 42 circuitry. The boost regulator 42 receives power from the switch 34 via conductor 40 and supplies an output to the battery 17 via conductor 44. The boost regulator 42 has a current source 272 which receives power from the compensator 266 (FIG. 3) via conductor 270. The current source supplies a current signal back to the switch 34 via conductor 262 and elsewhere throughout the boost regulator. The boost regulator 42 also has current control circuitry 274. The boost regulator receives input from the voltage control circuitry via conductor 60 and from the hot battery detector 66 via conductor 80. The boost regulator also supplies signals to the built-in test equipment 26 via several conductors collectively indicated as conductors 276A and 276B. The boost regulator further is interconnected with the hot battery detector 66 by conductor 278 and to the voltage control 46 via conductor 280 to exchange control and biasing signals therebetween.

Figure 5:
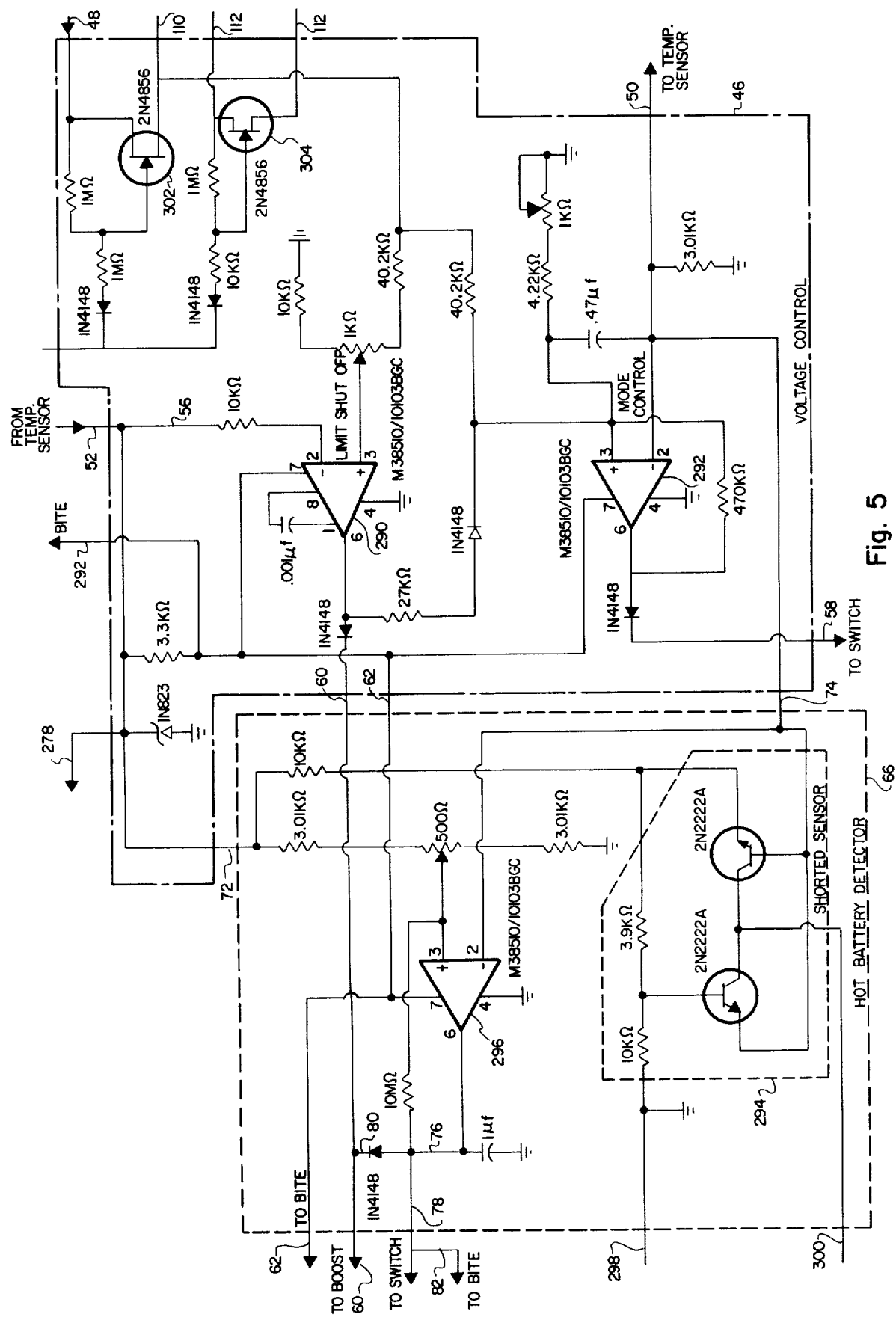
FIG. 5 is a circuit diagram of a voltage control circuit and a hot battery detector of a battery charger for use with the instant invention.

FIG. 5 illustrates the circuitry for the voltage control 46 and the hot battery detector 66. The voltage control circuit 46 receives a battery voltage signal via conductor 49 and a temperature signal from temperature sensing means 48 (FIG. 1) via conductors 50 and 52. The voltage control 46 has a limit shutoff amplifier 290 and a mode control amplifier 292. The two amplifiers 290 and 292 operate in conjunction to control the operation of the charger 14 between two operating modes. The first mode is a trickle mode charge (200 ma) in which the battery 17 is at a substantially fully charged condition (80%–85%) predetermined by detecting the battery voltage and battery temperature. The second mode is a boosting mode in which the charging current (6 amps) supplied by the boost regulator is substantially greater than the trickle charge current of the first mode. The boost mode recharges the battery more promptly to a substantially fully charged condition. The voltage control 46 also sends an output signal to the built-in test equipment via conductor 292.

FIG. 5 also illustrates the hot battery detector 66 which includes therewithin a shorted sensor detector 294. The shorted sensor detector receives an input via conductor 74 from the temperature sensor 48 and detects the existence of an electrical short in the temperature sensor. If the temperature sensor 48 is shorted, the shorted sensor detector 294 supplies an output signal indicative of the existence of a hot battery condition to the hot battery detector amplifier 296. The amplifier in turn supplies a signal to the switch 34 via conductor 78 indicative of a hot battery condition which in turn causes the switch 34 to become nonconductive. The hot battery detector 66 also is connected by conductors 298 and 300 to the cell balance detector 70 for biasing and signal transfer purposes.

Figure 6:
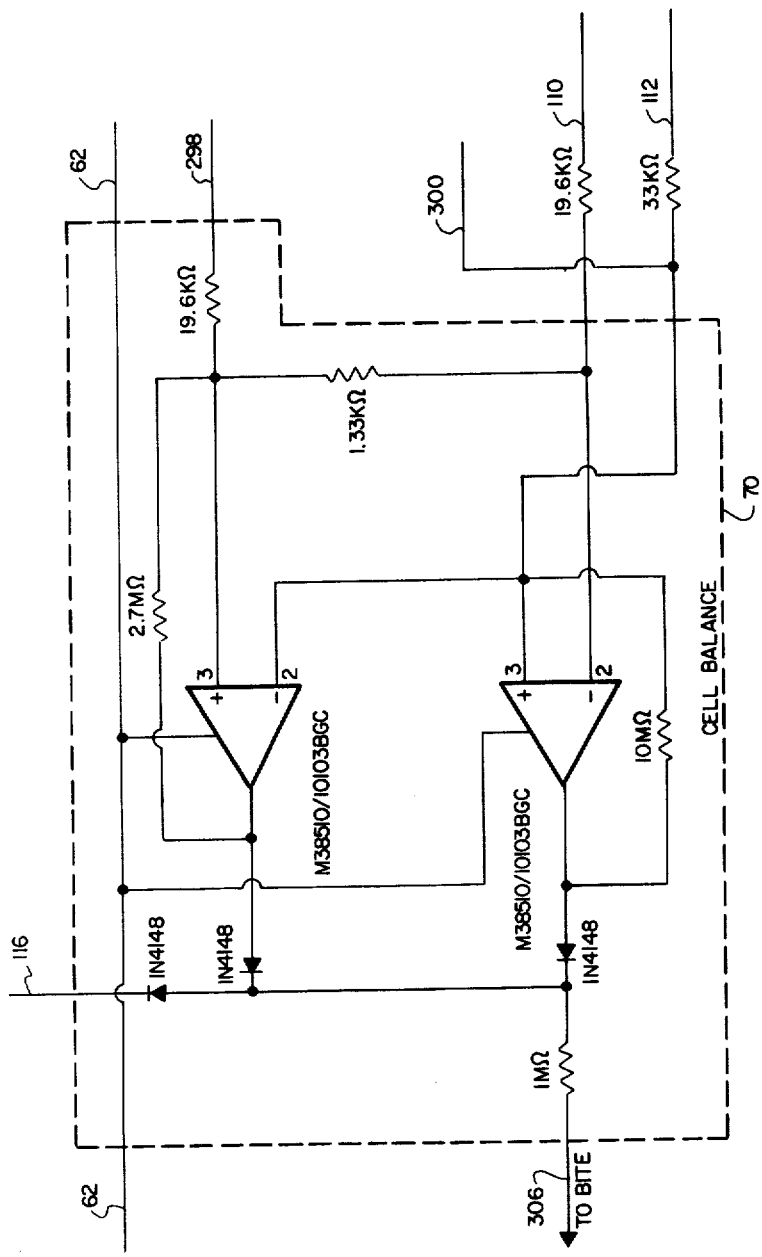
FIG. 6 is a circuit diagram of a cell balance detector of a battery charger for use with the instant invention.

The cell balance detector 70, shown in FIG. 6, receives a battery voltage signal via conductor 110 through a uni-junction 302 located for reference purposes in the voltage control 46 (FIG. 5). The cell balance detector 70 also receives a signal from approximately the midpoint of the individual cells of the battery via conductor 112 through a uni-junction 304 which is also located in the voltage control circuitry 46 of FIG. 5. The cell balance detector 70 determines whether or not an imbalanced condition exists between the upper half 17A and lower half 17B or each half of the cells of which the battery 17 is comprised. That is, the battery 17 is comprised of a plurality of individual cells, which is this particular embodiment are 20 separate cells. Cell balance is determined by measuring the voltage drop across each group of 10 cells. If there is a substantial voltage imbalance between the two separate halves or groups of 10 cells, the cell balance detector 70 sends a signal via conductor 116 to the switch 34 to cause the switch 34 to become nonconductive. Imbalanced conditions in the battery 17 occurring in one group of cells or the other can be a substantial safety hazard. The cell balance detector also has an output 306 which is supplied to the built-in test equipment 26.

Figure 7:
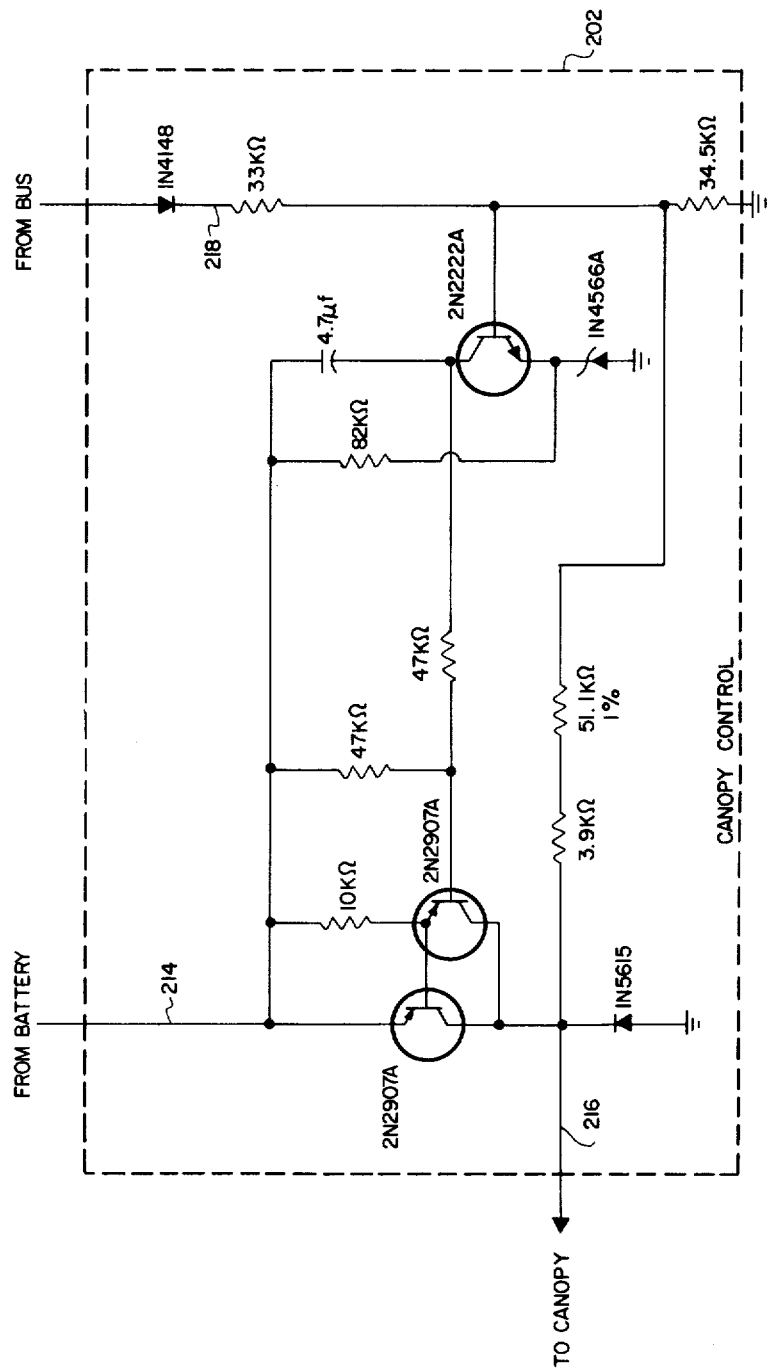
FIG. 7 is a circuit diagram of a canopy control circuit optionally positionable within the chassis of the battery system of the instant invention.

The canopy control circuitry 202 is illustrated in FIG. 7. The canopy control circuit 202 receives an input from the battery via conductor 214 and from the external source or the vehicle DC bus 218. Upon operation of the canopy, the canopy control determines whether the source of power is from the battery or from the bus. If the source of power is from the battery, the circuitry operates to integrate control operations and to shutdown canopy control operations to preclude wearing down the battery or draining the battery by continuous or frequent operation of the canopy. That is, it is undesirable to allow the battery to be discharged substantially through canopy operations. Thus, canopy control 202 limits the dischargeability of the battery 16 through uncontrolled or unheedful canopy operations. The output of the canopy control circuit 216 goes to the canopy operating switches and motors which in turn operate the aircraft canopy (in their equivalent depending upon the vehicle) to permit access to the aircraft when the aircraft is parked or when the engine is no longer operative.

Figure 8:
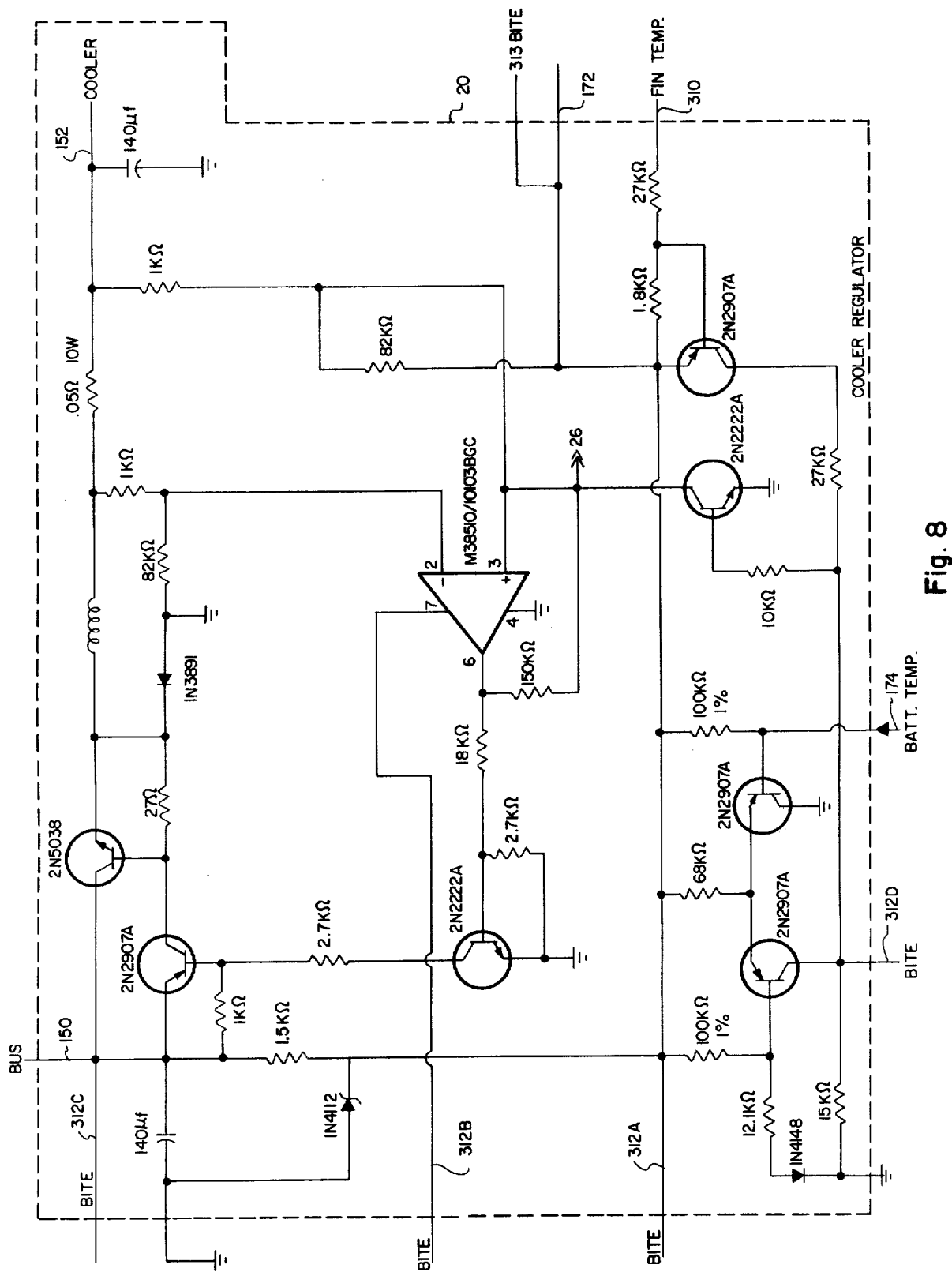
FIG. 8 is a circuit diagram of a cooler regulator of the cooling means for use with the instant invention.

The cooler regulator circuit 20 is illustrated in FIG. 8. The cooler regulator circuitry operates to supply power to peltier effect coolers 154 through 164 as hereinbefore discussed. The cooler regulator 20 receives an input from the external bus 30 via conductor 150 and supplies an output via conductor 152 to the peltier coolers 154 through 164. The cooler regulator 20 also receives an input from a temperature sensing device 170 via conductors 172 and 174. The temperature sensing device 170 (FIG. 1) senses the temperature proximate the battery which is reflective of battery temperature. The cooler regulator also receives a fin temperature input via conductor 310. The cooler regulator 20 receives the temperature reflective signals from the fin temperature sensor 168 and from the temperature sensing means 170 and causes the coolers to be activated when the battery temperature determined from the temperature reflective signal reaches a third preselected temperature (about 65° F. to 70° F.) at which cooling is desired. Similarly, the cooler regulator deactivates the coolers when the battery temperature is reflected by the temperature reflective signal sensed by the sensing means 170 deceases to a fourth preselected temperature (about 65° F.). The cooler regulator also has an output via conductors 312A, 312B, 312C and 312D to the built-in test equipment 26.

Figure 9:
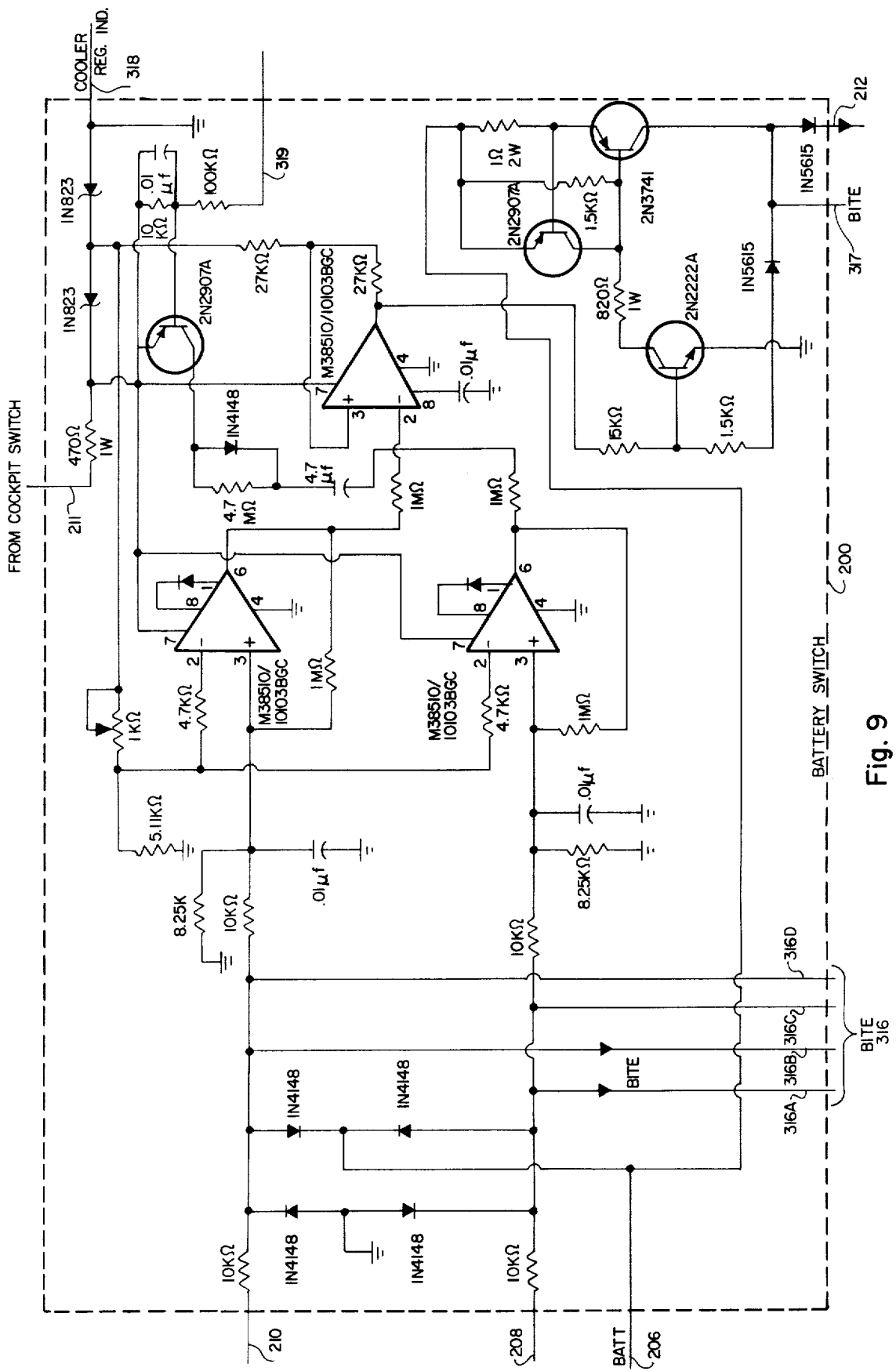
FIG. 9 is an optional battery switch positioned within the chassis of the battery charger of the instant invention.

FIG. 9 illustrates a battery switch 200 which is particularly adapted for use in the embodiment as herein disclosed. That is, it is designed for use in which there are two separate temperature maintained battery systems of the type herein disclosed as well as a vehicle having a separate DC bus which may have an independent source of DC power such as from an engine operated generator. The battery switch 200 receives an input from the battery output via conductor 206, from the bus via conductor 208 and from the other battery via conductor 210. The battery switch 200 also receives an input from the cockpit switch via conductor 211. Upon activation by the cockpit switch 28 by the user, the battery switch 200 senses the availability of DC power from either the other battery, the battery bus 30 or the battery as herein associated with the instant system. If the power on the bus detected via conductor 204 is of sufficient voltage (over about 20 volts), then power will be supplied to aircraft relays and other ancillary equipment via conductor 212 from the bus 30. If the bus and the other battery are below a certain output voltage (about 20 volts), as preselected by the user, then power will be supplied to aircraft relays and the like via conductor 212 from the illustrated battery 17 via conductor 206 and 212. The battery switch 200 also supplies various signals to the built-in test equipment 26 via a group of conductors identified by the numeral 316. The battery switch 200 is physically constructed in the instant application proximate the cooler regulator 20 (same circuit board) and have a common ground line 318 associated therewith. The aircraft or other vehicle may require a programmable time delay. It is optionally provided through the connector 10 (FIG. 1) via conductor 319.

Figure 10:
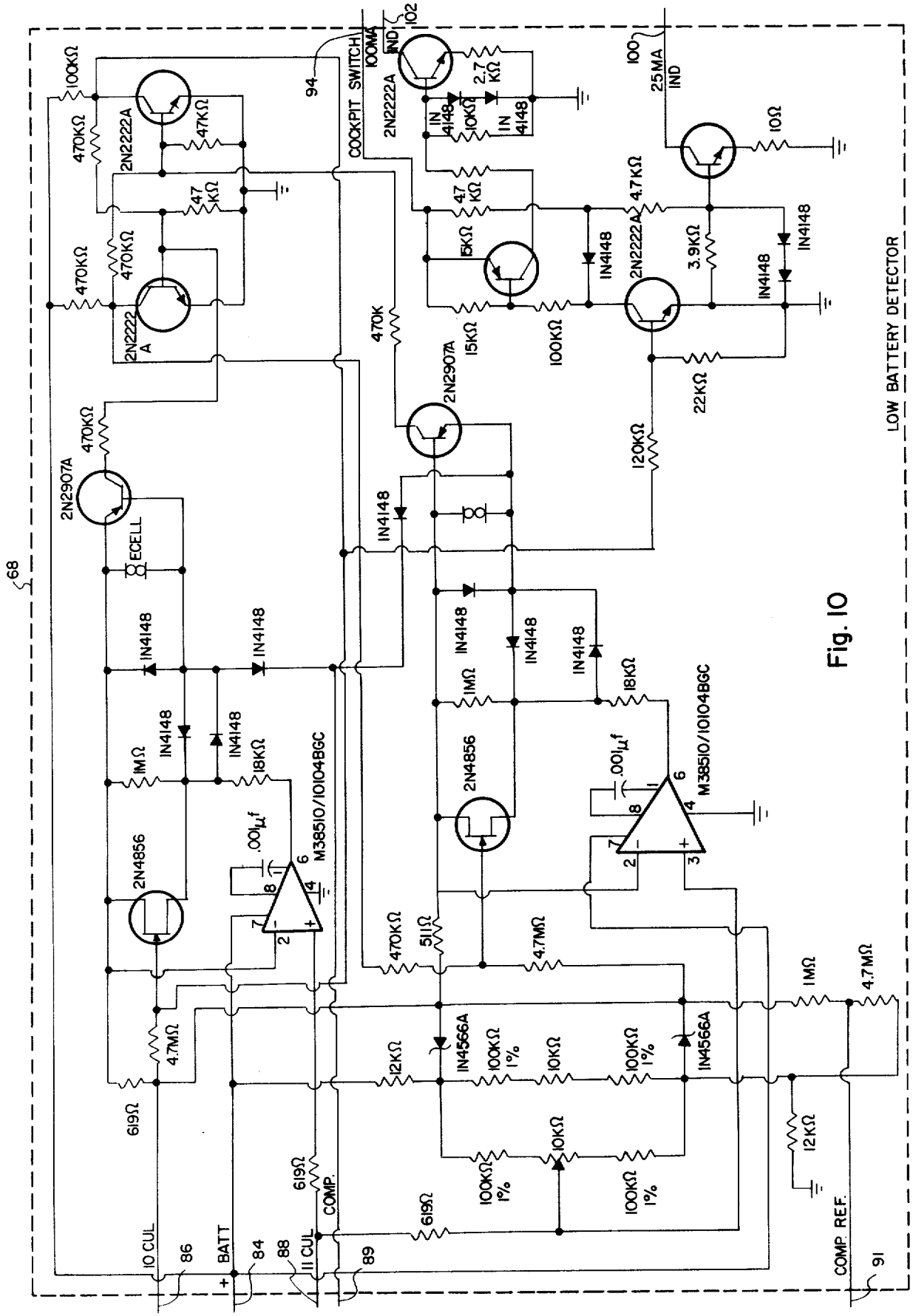
FIG. 10 is a circuit diagram of a low battery detector of the battery charger for use with the instant invention.

FIG. 10 illustrates the low battery detector 68. The low battery detector 68 receives an input 84 reflective of battery voltage. The detector also receives an input from the tenth cell or upper half 17A of the 20 cell battery via conductor 86. The detector also measures the voltage across the lower half 17B or second half of the 20 cell battery via conductors 88 and 90. Conductor 90 is a ground connection through a dropping resistor 322 (FIG. 1). The low battery detector 68 also receives an input from the cockpit switch 28 via conductor 94. The battery detector 68 also receives a compensating temperature input via conductors 89 and 91. It is well known that temperature affects battery voltage and battery capacity. A resistor 324 is positioned proximate the battery to measure battery temperature and supply a temperature reflective signal to the low battery detector 68. The low battery detector receives the temperature reflective signal and automatically compensates battery voltage and in turn battery capacity in relation to the temperature reflective signal supplied by the temperature sensor 324. The low battery detector 68 receives battery voltage across both the upper half and the lower half as well as across the entire battery and determines whether or not the voltage or capacity of the battery is depleted such that the battery is now in a low stage of charge or in a discharged condition (45% of fully charged). If the battery is in a discharged condition, various indications thereof are supplied to remote indicators via conductors 102 and 100.

Figure 11:
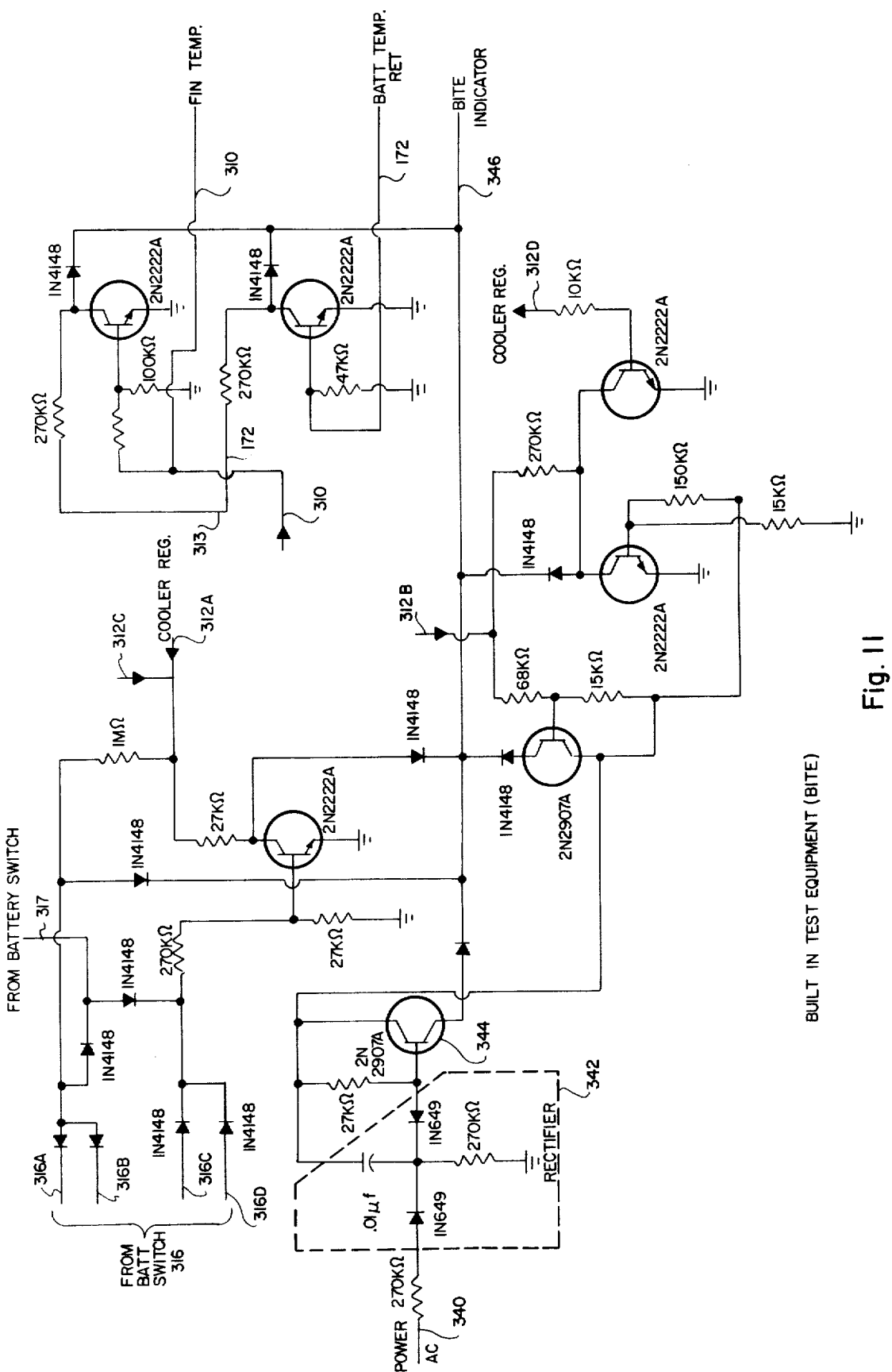
FIGS. 11 and 12 are circuit diagrams of built-in test equipment circuits for optionally positioning within the chassis for use with the instant invention.
Figure 12:
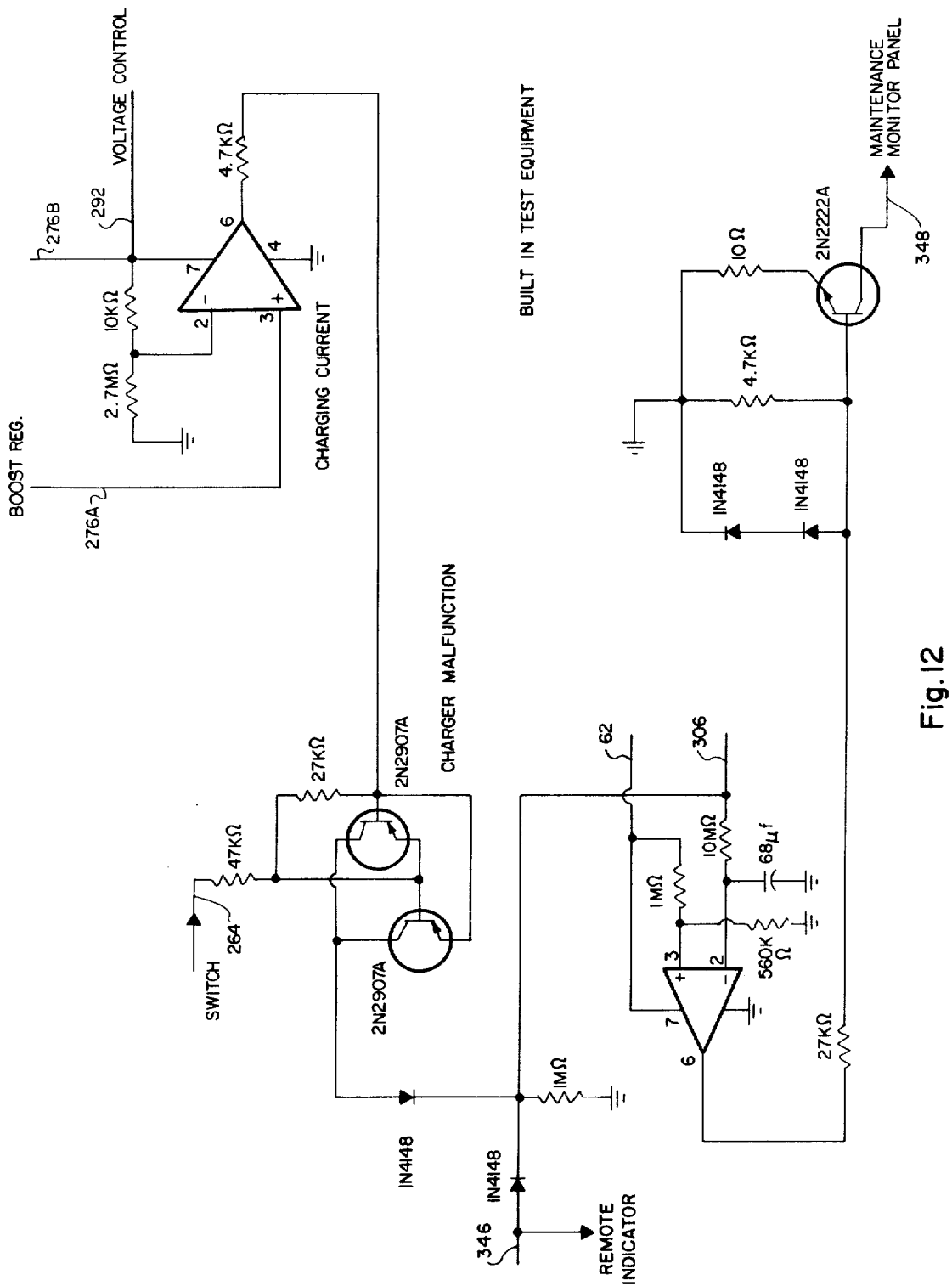

FIGS. 11 and 12 respectively show built-in test equipment or built-in test circuitry (BITE) which monitor various functions of the other circuits as hereinbefore disclosed and supply an indication to a remote indicator. Those skilled in the art will recognize that a variety of different testing functions may be devised to sample any particular aspect of operation of the circuits of the system herein disclosed and supply various indications of the testing to remote indicating means. The purpose of the test equipment is to provide an automatic fault indication to a remote location preferably visible to an operator (audible, if desired) so that the operator is apprised of system operation or system status and/or to provide indications of fault to maintenance personnel. The circuitry of FIG. 11 monitors various aspects of operation related to the low battery detector 68, the cooler regulator 20, and the battery switch 200. In particular, the test equipment of FIG. 11 receives an AC power input from an external source via conductor 340. It also receives input from the battery switch via conductors 316A through 316D and 317. It further receives input from the battery temperature sensor 70 via conductor 172, the fin temperature via conductor 130 and other conductors as indicated in FIG. 11. The circuitry includes a rectifier 342 to rectify the input AC power. Transistor 344 monitors the existence of heater power and cooler power to determine whether or not the heaters and the coolers are on simultaneously which would obviously be suggestive of a malfunction in circuitry or in detectors. The BITE circuitry 26, as illustrated in FIG. 1, monitors battery switch 34 functioning as well as cooler regulator functioning, supplies indications of proper functioning or improper functioning, as desired, to an external indicating means via conductor 346.

The BITE circuitry of FIG. 11 is also interconnected to the BITE circuitry of FIG. 12, as indicated by conductor 346 (FIG. 12). The BITE circuitry of FIG. 12 is conductively connected to the boost regulator and the switch by conductors as shown 264, 276a and 276b. It is also connected via conductors 62 and 306. The BITE circuitry of FIG. 12 detects the charging current being supplied by the boost regulator 42 and the switch 34, and detects the existence of a malfunction, such as excessive current or the absence of current, when a charging condition is called for. The built-in test equipment 26 also indicates cell balance conditions as well as the charge and malfunction conditions to an exterior maintenance monitoring panel via conductor 348.

Referring back to FIG. 1, a connector is indicated by the numeral 10. The connector constitutes connector means and is positioned to provide electrical connection points or connectors between external leads and the internal circuitry as herein described. The connector means may also be taken to be generically connecting devices which interconnect the circuitry, as herein disclosed, which are positioned on separate circuit boards, as known to those skilled in the art. It should be noted that between internal connecting devices, which interconnect various components, isolation filters are preferably installed of the type M15733/63-0001 to insulate the battery system, as herein disclosed, from external signal interference as well as to insulate external circuitry from electrical or electronic (EMI) interference from the operation of the battery system. Such filter use is optional based on the application as desired by the user.

Referring to the low battery detector 68, as illustrated in FIG. 1, a thermistor or sensor 322 is positioned between the battery ground and the low battery detector 68 to provide a temperature compensated signal in addition to the temperature compensating information provided by the temperature sensor 93. It is well known to those skilled in the art that battery capacity and battery self-discharge is a function of ambient temperature. The lower the temperature, the slower the self-discharge. The higher the ambient temperature, the greater or faster the rate of self-discharge. Accordingly, temperature compensated signals are provided to the low battery detector which in turn provides an external signal of battery capacity or the state of charge or discharge of the battery at preselected level.

The temperature sensing means 48 for the hot battery detector 66 is preferably a wire wound positive temperature coefficient resistor or thermistor. The resistors 170 or temperature sensors 170 and 324 are of similar nature. The positive temperature coefficient resistor or thermistor provides a more usable signal for detecting temperature variances providing temperature reflective signals as desired.

As hereinbefore discussed, the circuitry as described herein is contained within a chassis 12. The chassis may be made of any particularly desired material and preferably of a lightweight metal material, such as aluminum or comparable materials. The components as herein described are positioned within the chassis as described with respect to FIG. 2 to be a uniquely portable unit containing both a battery comprised of a plurality of battery cells (in this embodiment 20 cells) together with a battery charger and auxiliary equipment including test equipment. As a result, a temperature maintained battery system is a totally removable unit from a vehicle. In effect, the temperature maintained battery system may be regarded as a complete, separate and independent entity requiring only external connectors and preferably a source of external airflow. Accordingly, upon failure of any particular component or upon deterioration of the battery system for whatever reason, the battery system may be removed (remove the chassis) and a new or rebuilt unit installed by simply reinstalling it in the vehicle and plugging it in. Defective units may be returned to the factory for bench repairs as opposed to expensive on-site repairs.

Accordingly, it is to be understood that the embodiments of the instant invention herein described are merely illustrative of the application of the principals of the instant invention. Reference herein to details of the illustrated embodiment is not intended to limit the scope of the claims which themselves recite those features regarded as essential to the invention.

I claim:

1. A battery system comprising:
    a chassis;
    a battery positioned within said chassis and removably conductively connectable to an external direct current load;
    a battery charger positioned within said chassis and removably conductively connectable to an external source of direct current power and conductively connected to said battery, said charger having means to automatically selectively charge said battery when said battery is in a preselected state of discharge;
    heater means positioned within said chassis and removably conductively connectable to an external source of power, said heater means including heater element means and switch means, said switch means being conductively connected to said external AC source and said heater element means and operative between conductive and nonconductive conditions to activate and deactivate said heater element means in accordance with preselected temperature conditions within said chassis;
    cooling means positioned within said chassis comprising:
        a cooler regulator removably conductively connectable to receive power from an external source,
        first temperature sensing means conductively connected to said cooler regulator to supply chassis interior temperature reflective signals thereto,
        at least one peltier effect cooler element positioned within said chassis and conductively connected to said cooler regulator, wherein
        said cooler regulator activates and deactivates said cooler element in accordance with preselected temperature conditions within said chassis sensed by said temperature sensing means, and
        heat removal means associated with said cooler element to transfer heat from interior to exterior said chassis.

2. The system of claim 1 wherein said switch means of said heater means is a thermal switch which is conductive below a first preselected temperature and nonconductive above a second preselected temperature, said first and second preselected temperatures being selected so that said heater element means is energized to generate heat within said chassis and in turn heat said battery and to substantially maintain it above a preselected minimum temperature.

3. The system of claim 2 wherein said heater means has a plurality of heater element means which are electrical resistance heaters connected in series.

4. The system of claim 3 wherein said first preselected temperature is about 50° F. and said second preselected temperature is about 60° F.

5. The system of claim 1 wherein heat removal means includes forming said chassis to be enclosed with an air inlet and an air outlet, to receive an airflow from an external source and to exhaust said air flow and positioning the contents of said chassis therewithin to form an air passage passing proximate said battery in communication with said inlet and outlet.

6. The system of claim 5 wherein said heat removal means further includes cooling fins adapted external to said chassis and wherein said peltier effect coolers are positioned to transfer heat to said fins.

7. The system of claim 6 wherein said cooling means has a plurality of peltier effect coolers electrically connected in series.

8. The system of claim 7 wherein said first temperature sensing means of said cooling means is an electrical thermistor and wherein said cooler regulator activates said cooler element above a third preselected temperature and deactivates said cooler element below a fourth preselected temperature to in turn cool said battery to and substantially maintain it below a preselected maximum temperature.

9. The system of claim 8 wherein said thrid preselected temperature is from about 65° F. to about 70° F. and said fourth preselected temperature is about 65° F.

10. The system of claim 1 wherein said battery charger is comprised of:
    switch means conductively connected to receive power from said external source of direct current power;
    a boost regulator circuit conductively connected to said switch means to receive power therefrom and conductively connected to said battery to supply charging signals thereto;
    second temperature sensing means positioned within said chassis to sense temperature and to generate a battery temperature reflective signal;
    a voltage control circuit conductively connected (1) to said temperature sensing means to receive said temperature reflective signal, (2) to said switch means to supply a switching signal thereto, (3) to said battery to receive a battery voltage signal therefrom, and (4) to said boost regulator to supply a control signal thereto wherein said voltage control circuit determines the temperature adjusted state of charge of said battery from the temperature reflective signal and said battery voltage signal and supplies said switching signal and control signal to cause said battery to be charged in accordance with a preselected charging program related to the temperature adjusted state of discharge of said battery.

11. The system of claim 10 wherein said battery charger has a safety circuit which includes:
    a hot battery detector conductively connected to said second temperature sensing means to receive said temperature reflective signal therefrom and to said switch to supply a safety signal thereto to stop battery charging when said temperature reflective signal indicates that said battery has reached a preselected temperature; and a cell balance detector conductively connected to said battery to sense the voltage across portions thereof and to said switch to supply a safety signal to stop charging when the voltage across said portions indicates a preselected condition of imbalance.

12. The system of claim 11 wherein said safety circuit further includes a low battery detector conductively connected to said battery to detect battery capacity and to external indicator means to indicate the existence of a preselected low battery state of charge.

13. The system of claim 12 wherein said low battery detector has means to receive a battery voltage signal from said battery, third temperature sensing means to supply a battery temperature reflective signal to said low voltage detector and means to determine a temperature adjusted state of charge signal and supply a low battery signal when the battery state of charge is below a preselected level.

14. The system of claim 13 wherein said hot battery detector has means to detect the existence of a shorted second temperature sensing means and supplies a safety signal to stop charging to said switching means when such is detected.

15. The system of claim 14 wherein said hot battery detector supplies said safety signal when said temperature reflective signal indicates the existence of a temperature of about 115° F.

16. The system of claim 1 further including a testing circuit conductively connected to external indicator means through said chassis and selectively conductively connected to said battery charger, said cooling means and said heater means, wherein said circuit monitors the functioning of said charger and supplies signals indicative thereof to said external indicator.

17. The system of claim 1 wherein said battery is comprised of a plurality of closed cell nickel-cadmium battery cells.

18. In combination with a vehicle having a direct current bus operative to act selectively as a source of direct current power and to act as a direct current load and having a source of alternating current power and vehicle controls, a battery system comprising:

a chassis;

a battery positioned within said chassis and removably conductively connectable to said bus to supply power thereto when said bus is a load;

a battery charger positioned within said chassis and removably conductively connectable to said bus to receive power therefrom when said bus is an external source of direct current power and conductively connected to said battery, said charger having means to automatically selectively charge said battery when said battery is in a preselected state of discharge;

heater means positioned within said chassis and removably conductively connectable to said source of alternating current (AC) power, said heater means including heater element means and switch means, said switch means being conductively connected to said external AC source and said heater element means, and said switch means being operative between conductive and nonconductive conditions to activate and deactivate said heater element means in accordance with preselected temperature conditions within said chassis;

cooling means positioned within said chassis comprising:

a cooler regulator removably conductively connectable to receive power from an external source of direct current power, first temperature sensing means conductively connected to said cooler regulator to supply chassis interior temperature reflective signals thereto, at least one peltier effect cooler element positioned within said chassis and conductively connected to said cooler regulator, wherein said cooler regulator activates and deactivates said cooler element in accordance with preselected temperature conditions within said chassis sensed by said temperature sensing means, and heat removal means associated with said cooler element to transfer heat from interior to exterior said chassis.

19. The combination of claim 18 wherein said switch means of said heater means is a thermal switch which is conductive below a first preselected temperature and nonconductive above a second preselected temperature, said first and second preselected temperatures being selected so that said heater element means is energized to generate heat within said chassis and in turn heat said battery and to substantially maintain it above a preselected minimum temperature, and wherein said heater means has a plurality of heater element means which are electrical resistance heaters connected in series.

20. The combination of claim 19 wherein heat removal means includes forming said chassis to be enclosed with an air inlet and an air outlet, to receive an airflow from an external source and to exhaust said air flow and positioning the contents of said chassis therewithin to form an air passage passing proximate said battery in communication with said inlet and outlet, and wherein said heat removal means further includes cooling fans adapted external to said chassis and wherein said peltier effect coolers are positioned to transfer heat to said fins.

21. The combination of claim 20 wherein said cooling means has a plurality of peltier effect coolers electrically connected in series, and wherein said first temperature sensing means of said cooling means is an electrical thermistor and wherein said cooler regulator activates said cooler element above a third preselected temperature and deactivates said cooler element below a fourth preselected temperature to in turn cool said battery to and substantially maintain it below a preselected maximum temperature.

22. The combination of claim 21 wherein said battery charger is comprised of:

switch means conductively connected to receive power from said external souce of direct current power;

a boost regulator circuit conductively connected to said switch means to receive power therefrom and conductively connected to said battery to supply charging signals thereto;

second temperature sensing means positioned within said chassis to sense temperature and to generate a battery temperature reflective signal;

a voltage control circuit conductively connected (1) to said temperature sensing means to receive said temperature reflective signal, (2) to said switch means to supply a switching signal thereto, (3) to said battery to receive a battery voltage signal therefrom, and (4) to said boost regulator to supply a control signal thereto wherein said voltage control circuit determines the temperature adjusted state of charge of said battery from the temperature reflective signal and said battery voltage signal and supplies said switching signal and control signal to cause said battery to be charged in accordance with a preselected charging program related to the temperature adjusted state of discharge of said battery.

23. The combination of claim 22 wherein said battery charger has a safety circuit which includes:
- a hot battery detector conductively connected to said second temperature sensing means to receive said temperature reflective signal therefrom and to said switch to supply a safety signal thereto to stop battery charging when said temperature reflective signal indicates that said battery has reached a preselected temperature;
- a cell balance detector conductively connected to said battery to sense the voltage across portions thereof and to said switch to supply a safety signal to stop charging when the voltage across said portions indicates a preselected condition of imbalance; and wherein said safety circuit further includes a low battery detector conductively connected to said battery to detect battery capacity and to external indicator means to indicate the existence of a preselected low battery state of charge.

24. The combination of claim 18 wherein said vehicle is an aircraft which has vehicle controls including a battery system, cockpit switch and canopy controls and which has a plurality of said battery systems, each of which includes:
- a vehicle function circuit having a battery switch conductively connected to said bus, the battery of each of said systems connected to said battery system cockpit switch, said battery switch receiving voltage signals from said cockpit switch to connect a charged battery to said bus when said bus voltage signal is below a preselected level.

25. The system of claim 24 wherein said vehicle function circuit includes a canopy control circuit connected to said canopy controls and to said battery to supply power to said canopy controls when said battery is above a preselected voltage.

* * * * *